United States Patent [19]

Saito

[11] Patent Number: 4,572,579

[45] Date of Patent: Feb. 25, 1986

[54] DUMP APPARATUS

[76] Inventor: Ken Saito, 2-51-30, Tama-cho, Fuchu-shi, Tokyo, Japan

[21] Appl. No.: 563,138

[22] Filed: Dec. 19, 1983

[51] Int. Cl.$^4$ ................................................ B60P 1/16
[52] U.S. Cl. ............................... 298/1 A; 254/93 HP; 298/10; 298/22 R; 298/22 D; 414/469; 414/917
[58] Field of Search ................... 414/917, 678, 469; 298/1 A, 1 H, 10, 22 R, 22 F, 22 J, 22 D, 21 R, 19 R, 19 V; 254/93 R, 93 HP

[56] References Cited

U.S. PATENT DOCUMENTS

| | | | |
|---|---|---|---|
| 2,495,092 | 1/1950 | Cox et al. | 254/93 HP X |
| 2,804,118 | 8/1957 | Bayerkohler | 254/93 HP X |
| 3,211,425 | 10/1965 | Greulich et al. | 254/93 HP X |
| 3,521,861 | 7/1970 | Freudental et al. | 254/93 HP |
| 3,659,899 | 5/1972 | Phillips et al. | 298/1 A X |
| 3,711,157 | 1/1973 | Smock | 298/22 R X |

FOREIGN PATENT DOCUMENTS

| | | | |
|---|---|---|---|
| 2354388 | 5/1974 | Fed. Rep. of Germany | 254/93 HP |
| 835142 | 5/1960 | United Kingdom | 254/93 HP |
| 161243 | 7/1964 | U.S.S.R. | 298/22 R |

Primary Examiner—Frank E. Werner
Attorney, Agent, or Firm—W. Edward Johansen

[57] ABSTRACT

A dump apparatus comprising a base frame removably mounted on a rear body of a truck etc., a loading box rotatably mounted on the base plate, an inflatable bag provided between the loading box and the base plate and a hose for feeding exhaust gas from an engine into the bag to inflate the same and tip the loading box by the inflation of the bag.

5 Claims, 6 Drawing Figures

DUMP APPARATUS

BACKGROUND OF THE INVENTION

1. Field of the Invention

This invention relates to a dump apparatus for tipping a loading box of a motor truck etc. by utilizing an exhaust gas pressure of the motor truck etc.

2. Description of Prior Art

A conventional dump apparatus for tipping a loading box of a motor truck etc. is, in general, originally built in the truck to provide a dedicated dump truck. The dump apparatus of this kind has its own driving means, such as a hydraulic driving means or a mechanical driving means for tipping the loading box of the truck, so that the dump apparatus should inevitably be rendered complicated in structure and bulky in size. In addition, the level of the loading box is raised by the driving means mounted under the loading box, which results in lowering the workability of the dump apparatus. Above all, the conventional dump apparatus has a fatal shortcoming that it cannot be easily applied to a normal motor truck.

OBJECTS OF THE INVENTION

It is a primary object of the present invention to provide a dump apparatus which is capable of tipping a loading box by a simple driving means utilizing an exhaust gas pressure of the truck without using a special driving means provided for the dump apparatus.

It is a second object of the present invention to provide a dump apparatus which is capable of lowering the level of the loading box and improving the workability of the dump apparatus.

It is a third object of the present invention to provide a dump apparatus simple in structure and light in weight which is capable of being easily and removably mounted on an ordinary motor truck or tractor.

SUMMARY OF THE INVENTION

In accordance with the present invention, there is provided a dump apparatus comprising a base frame removably mounted on a rear body of a motor truck; a loading box which is rotatably mounted, at an end portion of the bottom thereof, on said base frame; an upper member rotatably mounted, at an end thereof, on the bottom of said loading box; a lower member provided on said base frame in association with said upper member; an inflatable bag provided between said upper and lower members; a hose communicating, at an end thereof, with the interior of said bag and having, at the opposite end thereof, a coupler for an exhaust tube of the truck; and flexible strut members provided between said upper and lower members for restricting the inflation of the bag.

DESCRIPTION OF EMBODIMENT

Figure 1:
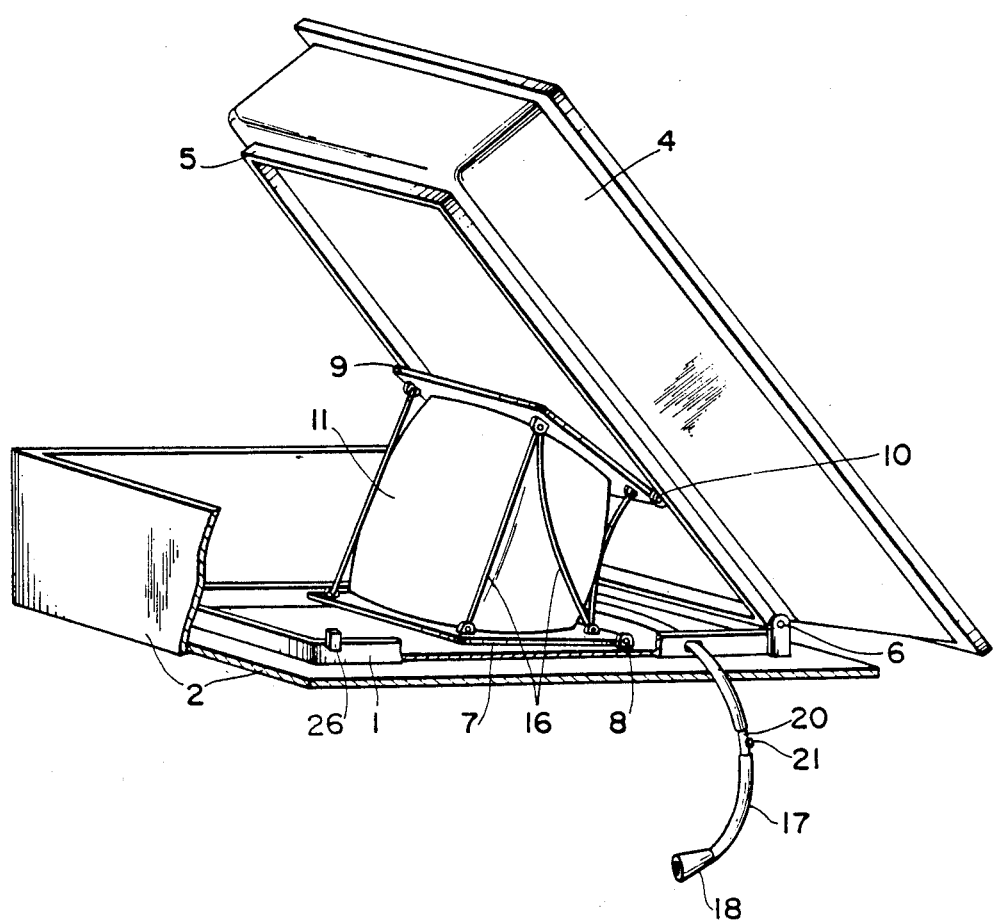
FIG. 1 is a perspective view of one form of a dump apparatus according to the present invention.
Figure 2:
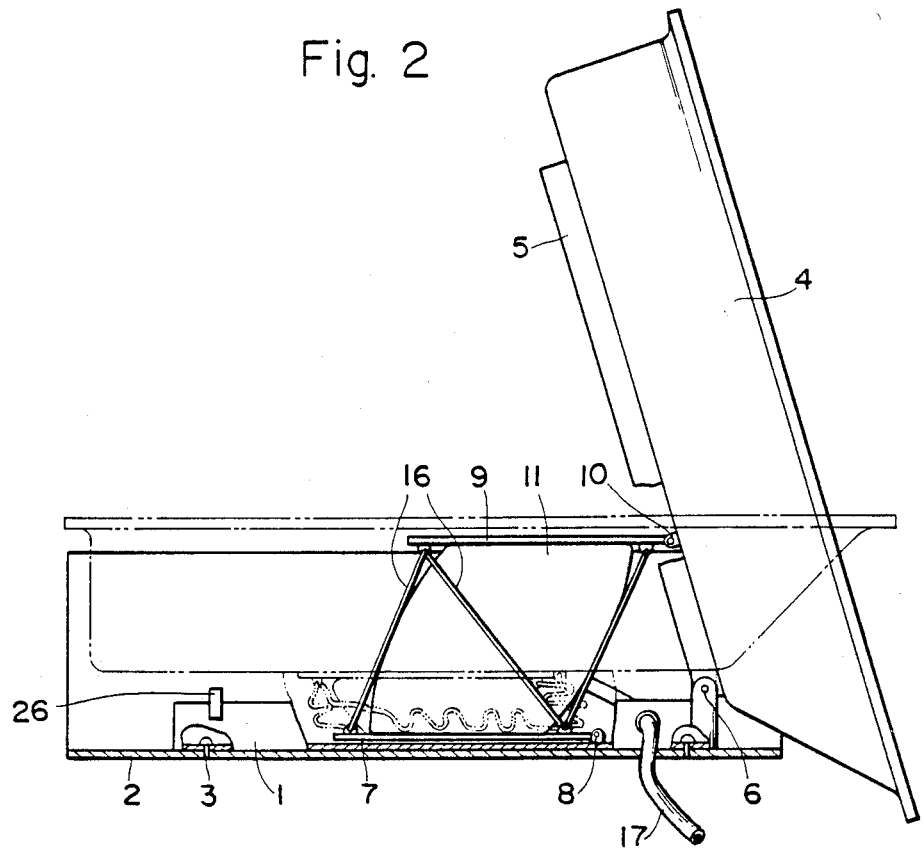
FIG. 2 is a side elevation view of the dump apparatus of FIG. 1.

Referring now to FIGS. 1 and 2, there is illustrated one form of a dump apparatus according to the present invention. Numeral 1 designates a base frame which is removably fixed to a floor of a rear body 2 of a motor truck or a motor tractor by a fixing means 3 such as a bolt. Numeral 4 designates a loading box which is provided, at the bottom thereof, with a frame 5 corresponding to the base frame 1. The frame 5 is pivotally connected, at an end portion thereof, to an end portion of the base frame 1 by a hinge 6. 7 is a lower member generally formed in a square and pivotally connected, at an end thereof, to the base frame 1 by a hinge 8. 9 is an upper member which is also formed generally in a square and pivotally connected, at an end thereof, to the frame 5 at a position corresponding to that of the lower member 7 by a hinge 10.

Figure 3:
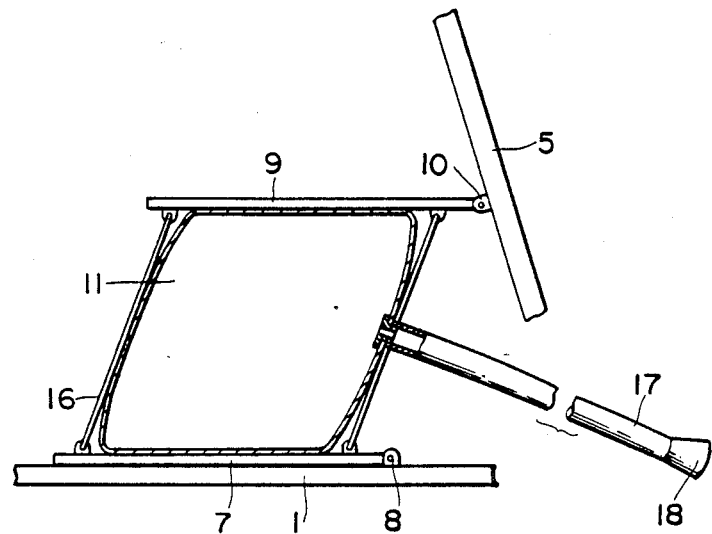
FIGS. 3(a) and (b) are cross sectional views of a first and a second form of a bag usable in the present invention, respectively.
Figure 3:
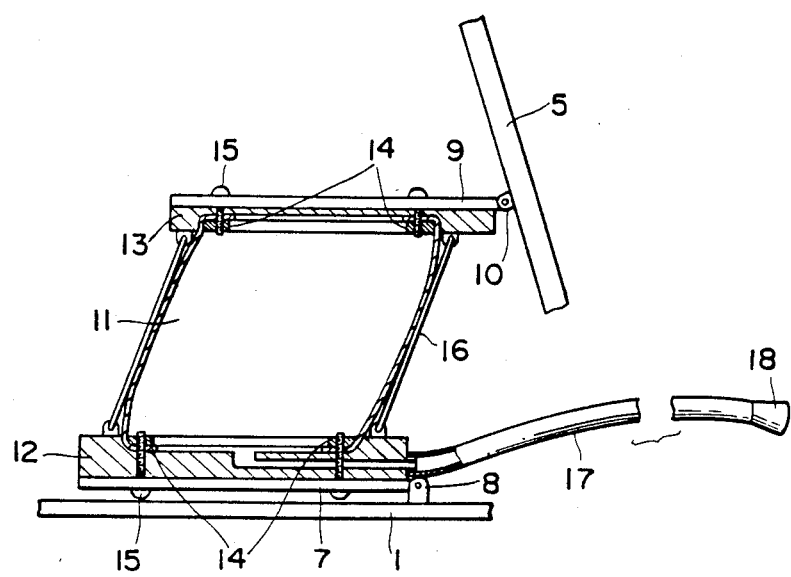

11 is an inflatable bag which is fixed at its top and bottom to the upper member 9 and the lower member 7, respectively. The bag 11 is made for example of a material composed of neoprene and nylon fiber and has a heat resistance of about 130° C. and a pressure resistance of about 0.8 kg/cm$^2$. The bag 11 is for example 540 mm in diameter and 570 mm in length. FIGS. 1, 2 and FIG. 3(a) illustrate one form of the bag in which the top and the bottom of the bag 11 are fixed to the upper member 9 and the lower member 7 by an adhesive, respectively. FIG. 3(b) illustrates another form of the bag 11, in which the bag 11 is made of a tubular material and the upper opening and the lower opening thereof are fixed to the upper member 9 and the lower member 7 by locking rings 14 and bolts 15 through an upper auxiliary member 13 and a lower auxiliary member 12, respectively. The dump apparatus employing the first form of bag is suitably applied to a light truck and the dump apparatus incorporating the second form of bag therein is suitable for a truck having an engine of larger displacement.

Flexible strut members 16 having the same length are provided between the upper member 9 and the lower member 7, and are connected thereto in the vicinity of each corner thereof, so as to extend in parallel with each other when the strut members 16 are brought into substantially upright positions. The flexible strut members 16 are made for example of a wire, a wire rope, chain, etc. and they are contractile into a compact form when the dump apparatus is in the inoperative condition and capable of being set substantially upright when the dump apparatus is operated. The strut members 16 function to restrict excessive inflation of the bag 11 in the forward or rearward direction (leftward or rightward direction in FIGS. 1 and 2) and control the inflation of the bag 11 so as to expand equally in the forward and rearward directions. Additional flexible strut members 16 are further provided on the side of the bag 11 so as to extend diagonally between the upper and lower members 9 and 7 as illustrated in FIGS. 1 and 2 for restricting the excessive expansion of the bag 11 in the lateral direction.

Figure 4:
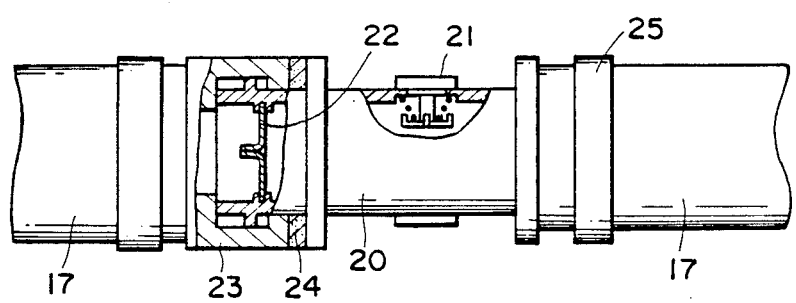
FIG. 4 is a partially sectional view of a safety valve employable in the present invention.

17 is a hose for feeding an exhaust gas from an engine of the truck etc. to the bag 11 which is made of a material having heat and pressure resistance as of the bag 11. In the first form of bag as illustrated in FIGS. 1, 2 and 3(a), the hose 17 communicates, at its end, with the interior of the bag 11 through an opening of the bag 11 formed on the side thereof. In the second form of bag as illustrated in FIG. 3(b), the hose 17 communicates, at an end thereof, with the interior of the bag 11 through the lower auxiliary member 12. Another end of the hose 17 is provided with a conical coupler 18 made for example of a heat-resistant rubber etc. This conical coupler 18 is applicable to an exhaust tube 19 (FIG. 5) of the truck etc. having a diameter of about 25 mm to 40 mm. Referring to FIGS. 1 and 4, the hose 17 has, at its intermediate position, a safety valve 20 having a function of a check valve. The safety valve 20 is so formed that a valve member 21 thereof is opened when a pressure of 0.6 kg/cm$^2$ or more is applied thereto. Referring to FIG. 4, the safety valve 20 further has, a check valve 22 for passing only the exhaust gas fed from the coupler 18. One end of the safety valve 20 is firmly connected to the hose 17 by a band 25 and another end of the safety valve 20 is connected to the hose 17 by a disengageable joint 23 through a packing 24.

The dump apparatus having the arrangement as described above operates in a manner as will be described below.

Figure 5:
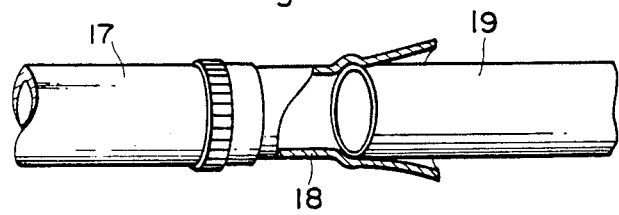
FIG. 5 is a partially sectional view showing the coupling of a hose to an exhaust tube of a truck etc.

First, referring to FIGS. 1 and 2, the dump apparatus is fixed to the rear body 2 of the motor truck or motor tractor by the bolt 3. The dump apparatus may be left fixed to the rear body 2 in case the dump apparatus is used continually. To tip the loading box 4, the engine of the truck is driven in an idling state and the coupler 18 of the hose 17 is fitted to the exhaust tube 19 (FIG. 5). Then, the exhuast gas having a pressure of about 0.5 kg/cm$^2$ is gradually fed into the bag 11 to expand the bag 11. The bag 11 is first expanded at the forward portion thereof and the loading box 4 is tilted at a certain angle (FIG. 1). When the exhaust gas is further fed into the bag 11, the forward strut members 16 is extended to its full length and the upward expansion of the forward portion of the bag 11 is stopped. Thereafter, the rear portion of the bag 11 begins to expand upwardly until the upper member 9 is brought into a position where it is in parallel with the lower member 7 (FIGS. 2, 3(a) and 3(b)) to tilt the loading box 4 at an angle of about 75° for dumping operation. After completion of the dumping operation, the hose 17 of the bag side is disengaged from the joint 23 (FIG. 4) to let the gas in the bag 11 be released into air and lower the loading box 4.

When the loading box 4 is being lowered, the frame 5 is guided by positioning means 26 provided on the opposing sides of the base frame 1 so as not to be offset relative to the base frame 1. After the loading box 4 is lowered to its normal position, the frame 5 and the base frame 1 are locked by a locking means (not shown) so that the loading box 4 may not vibrate even if the truck runs.

Although the exhaust gas from the engine is utilized for the driving means in the foregoing embodiments, when a vehicle to which the dump apparatus of the present invention is applied has a compression air supplying means, a pneumatic pressure may be utilized for the driving means.

As described above, according to the present invention, a bulky and complicated driving means specially provided for a dump apparatus in the conventional dump truck etc. is not needed, and a simplified driving means utilizing exhaust gas from an engine can be used to tip a loading box of a dump apparatus. As the special driving means may be omitted, the dump apparatus can be made compact and can be removably mounted on an ordinary truck or tractor. In addition, the level of a loading box can be lowered to improve the workability owing to the omission of the special driving means.

I claim:

1. A dump apparatus comprising:
   (a) a base frame removably mounted on a rear body of a motor truck;
   (b) a frame pivotally connected, at an end portion thereof, to an end portion of said base frame;
   (c) a loading box fixedly mounted on said frame;
   (d) an upper member pivotally connected, at an end thereof, to said frame;
   (e) a lower member pivotally connected, at an end thereof, to said base frame in association with said upper member;
   (f) an inflatable bag, which is made of a material composed of neoprene and nylon fiber having a heat resistance of about 130 C. and a pressure resistance of about 0.8 kg/cm$^2$, disposed between said upper member and said lower member, and fixed to said upper member in the top thereof and to said lower member in the bottom thereof, respectively, by an adhesive;
   (g) a plurality of parallel flexible strut members disposed between, and connected to, said upper member and said lower member with at least one strut located on each side of the bag, so as to restrict excessive inflation of said inflatable bag; and
   (h) a hose connected, at an end thereof, to said inflatable bag communicating with the interior of said inflatable bag and having, at the opposite end thereof, a coupler for an exhaust tube of the truck.

2. A dump apparatus as recited in claim 1, wherein said flexible strut members are of a wire which is contractile into a compact form when the dump apparatus is in an inoperative condition.

3. A dump apparatus as recited in claim 1, wherein said flexible strut members are of a wire rope which is contractile into a compact form when the dump apparatus is in an inoperative condition.

4. A dump apparatus as recited in claim 1, wherein said flexible members are of a chain which is contractile into a compact form when the dump apparatus is in an inoperative condition.

5. A dump apparatus comprising:
   (a) a base frame removably mounted on a rear body of a motor truck;
   (b) a frame pivotally connected, at an end portion thereof, to an end portion of said base frame;
   (c) a loading box fixedly mounted on said frame;
   (d) an upper member pivotally connected, at an end thereof, to said frame;
   (e) a lower member pivotally connected, at an end thereof, to said base frame in association with said upper member;
   (f) an inflatable bag, which is made of a tubular material having an upper opening and a lower opening composed of neoprene and nylon fiber having a heat resistance of about 130 C. and a pressure resistance of about 0.8 kg/cm$^2$, disposed between said upper member and said lower member, and fixed to said upper member in the upper opening thereof and to said lower member in the lower opening thereof, respectively, by locking rings and bolts through an upper auxiliary member and a lower auxiliary member, respectively;
   (g) a plurality of parallel flexible strut members disposed between, and connected to, said upper member and said lower member with at least one strut located on each side of the bag, so as to restrict excessive inflation of said inflatable bag; and
(h) a hose connected, at an end thereof, to said inflatable bag communicating with the interior of said inflatable bag and having, at the opposite end thereof, a coupler for an exhaust tube of the truck.

* * * * *